United States Patent
Osthelder et al.

(10) Patent No.: US 10,155,578 B1
(45) Date of Patent: Dec. 18, 2018

(54) METHOD AND SYSTEM FOR CONTROLLING A MARINE DRIVE DURING SHIFT SENSOR FAULT

(71) Applicant: Brunswick Corporation, Lake Forest, IL (US)

(72) Inventors: Robert Raymond Osthelder, Omro, WI (US); Gene A. Smedema, Princeton, WI (US); Matthew W. Snyder, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/678,566

(22) Filed: Aug. 16, 2017

(51) Int. Cl.
*B63H 21/21* (2006.01)
*G05D 1/00* (2006.01)
*B63H 23/08* (2006.01)
*B63H 23/30* (2006.01)
*F02D 41/02* (2006.01)
(Continued)

(52) U.S. Cl.
CPC .......... *B63H 21/213* (2013.01); *B63H 23/08* (2013.01); *B63H 23/30* (2013.01); *F02D 41/0225* (2013.01); *F02D 41/222* (2013.01); *G05D 1/0016* (2013.01); *B63B 2758/00* (2013.01); *B63H 25/02* (2013.01); *B63H 2025/026* (2013.01); *F02D 2200/50* (2013.01)

(58) Field of Classification Search
CPC ...... B63H 21/213; B63H 23/08; B63H 23/30; B63H 25/02; B63H 2025/026; F02D 41/0225; F02D 41/222; F02D 2200/50; G05D 1/0016; B63B 2758/00
See application file for complete search history.

(56) References Cited

U.S. PATENT DOCUMENTS

| 4,257,506 A | 3/1981 | Bankstahl |
| 4,753,618 A | 6/1988 | Entringer |

(Continued)

OTHER PUBLICATIONS

Belter et al., "Lockout for Remote Controls on Marine Vessels", Unpublished U.S. Appl. No. 14/992,513, filed Jan. 11, 2016.

(Continued)

*Primary Examiner* — Hussein Elchanti
(74) *Attorney, Agent, or Firm* — Andrus Intellectual Property Law LLP (57) ABSTRACT

A system for controlling propulsion of a marine vessel by a marine drive is provided, the marine drive having a marine engine that effectuates rotation of propulsor through a shift system that shifts amongst at least a forward gear position, a reverse gear position, and a neutral position. The system includes a remote control having a lever movable to provide a throttle demand input for controlling the marine engine and a shift demand input for controlling the shift system. A shift demand sensor measures a shift demand lever position to provide the shift demand input, and a throttle demand sensor measures a throttle demand lever positions to provide the throttle demand input. A control module is configured to detect shift demand sensor failure based on the shift demand lever position values and assign a predetermined throttle demand lever position as shift command position. When the throttle demand lever position reaches the shift command position, a shift command is generated instructing a change in gear position of the shift system.

20 Claims, 7 Drawing Sheets

(51) Int. Cl.
*F02D 41/22* (2006.01)
*B63H 25/02* (2006.01)

(56) References Cited

U.S. PATENT DOCUMENTS

| | | | |
|---|---|---|---|
| 4,794,820 A | 1/1989 | Floeter | |
| 4,952,181 A | 8/1990 | Entringer et al. | |
| 5,022,370 A * | 6/1991 | Ferguson | F02P 5/1521 |
| | | | 123/406.29 |
| 5,828,974 A | 10/1998 | Hawarden et al. | |
| 6,015,365 A | 1/2000 | Kolb et al. | |
| 6,109,986 A | 8/2000 | Gaynor et al. | |
| 6,273,771 B1 | 8/2001 | Buckley et al. | |
| 6,517,396 B1 * | 2/2003 | Into | B63H 21/21 |
| | | | 440/84 |
| 6,692,320 B1 | 2/2004 | Sawyer | |
| 6,755,703 B1 | 6/2004 | Erickson | |
| 6,929,518 B1 | 8/2005 | Sawyer et al. | |
| 6,942,530 B1 | 9/2005 | Hall et al. | |
| 7,568,404 B2 | 8/2009 | Grossman et al. | |
| 8,224,512 B1 * | 7/2012 | Dengel | B63H 21/21 |
| | | | 114/144 RE |
| 8,439,800 B1 | 5/2013 | Bazan et al. | |
| 8,961,246 B1 | 2/2015 | Kirchhoff et al. | |
| 9,043,058 B1 | 5/2015 | Camp et al. | |
| 9,103,287 B1 | 8/2015 | Arbuckle et al. | |
| 9,156,537 B1 | 10/2015 | Nakayasu | |
| 9,272,764 B2 | 3/2016 | Bamba | |
| 2004/0226801 A1 | 11/2004 | De Jonge et al. | |
| 2008/0201031 A1 * | 8/2008 | Ito | B63H 21/213 |
| | | | 701/21 |
| 2013/0269467 A1 * | 10/2013 | Rice | G05G 1/04 |
| | | | 74/491 |
| 2014/0229122 A1 * | 8/2014 | Horabin | G05B 23/0235 |
| | | | 702/35 |
| 2015/0088387 A1 * | 3/2015 | Bialas | F16H 61/0213 |
| | | | 701/51 |
| 2015/0107391 A1 * | 4/2015 | Jeong | F16H 59/105 |
| | | | 74/473.3 |
| 2015/0219528 A1 * | 8/2015 | Djelassi | F02C 9/28 |
| | | | 702/44 |
| 2017/0114889 A1 * | 4/2017 | Yoon | F16H 61/688 |
| 2017/0240164 A1 * | 8/2017 | Gaviani | B60K 1/02 |

OTHER PUBLICATIONS

Anschuetz et al., "Method and Control System for Controlling a Marine Internal Combustion Engine", Unpublished U.S. Appl. No. 15/597,798, filed May 17, 2017.

Hanes et al., "Directly Mounted Shaft Actuator", Unpublished U.S. Appl. No. 14/627,323, filed Feb. 20, 2015.

* cited by examiner

METHOD AND SYSTEM FOR CONTROLLING A MARINE DRIVE DURING SHIFT SENSOR FAULT

FIELD

The present disclosure relates to methods and systems for controlling a marine drive for propelling a marine vessel, and more specifically to control methods and systems that allow continued operation and control of system after failure of a shift demand sensor.

BACKGROUND

The following U.S. Patents and Applications provide background information and are incorporated herein by reference in entirety.

U.S. Pat. No. 4,257,506 discloses a male cone member of a cone clutch mechanism that has two springs, each encircling cam faces on the male cone member and bearing against the forward and reverse clutch gears, respectively, to bias the cone member away from its center or neutral position toward either the forward or reverse clutch gear. An eccentric roller on the shift actuator shaft engages with a circumferential groove in the male cone member to provide a vibrating force against the member for shifting. The shift means uses a cam and bell crank mechanism to convert axial movement of the shift controller to rotary movement of the actuator shaft.

U.S. Pat. No. 4,753,618 discloses a shift cable assembly for a marine drive that includes a shift plate, a shift lever pivotally mounted on the plate, and a switch actuating arm pivotally mounted on the plate between a first neutral position and a second switch actuating position. A control cable and drive cable interconnect the shift lever and switching actuating arm with a remote control and clutch and gear assembly for the marine drive so that shifting of the remote control by a boat operator moves the cables to pivot the shift lever and switch actuating arm which in turn actuates a shift interrupter switch mounted on the plate to momentarily interrupt ignition of the drive unit to permit easier shifting into forward, neutral and reverse gears. A spring biases the arm into its neutral position and the arm includes an improved mounting for retaining the spring in its proper location on the arm.

U.S. Pat. No. 4,952,181 discloses a shift cable assembly for a marine drive having a clutch and gear assembly that includes a remote control for selectively positioning the clutch and gear assembly into forward, neutral and reverse, a control cable connecting the remote control to a shift lever pivotally mounted on a shift plate, a drive cable connecting the shift lever on the shift plate to the clutch and gear assembly, and a spring guide assembly with compression springs biased to a loaded condition by movement of the remote control from neutral to forward and also biased to a loaded condition by movement of the remote control from neutral to reverse. The bias minimizes chatter of the clutch and gear assembly upon shifting into gear, and aids shifting out of gear and minimizes slow shifting out of gear and returns the remote control to neutral, all with minimum backlash of the cables. The spring guide assembly includes an outer tube mounted to the shift plate, and a spring biased plunger axially reciprocal in the outer tube and mounted at its outer end to the shift lever.

U.S. Pat. No. 8,439,800 discloses a shift control system for a marine drive applies partial clutch engagement pressure upon initial shifting from forward to reverse to prevent stalling of the engine otherwise caused by applying full clutch engagement pressure upon shifting from forward to reverse.

U.S. Pat. No. 8,961,246 discloses systems and methods for controlling shift in a marine propulsion device. A shift sensor outputs a position signal representing a current position of a shift linkage. A control circuit is programmed to identify an impending shift change when the position signal reaches a first threshold and an actual shift change when the position signal reaches a second threshold. The control circuit is programmed to enact a shift interrupt control strategy that facilitates the actual shift change when the position signal reaches the first threshold, and to actively modify the first threshold as a change in operation of the marine propulsion device occurs.

U.S. Pat. No. 9,043,058 discloses methods and systems for facilitating shift changes in a marine propulsion device having an internal combustion engine and a shift linkage that operatively connects a shift control lever to a transmission for effecting shift changes amongst a reverse gear, a neutral position and a forward gear. A position sensor senses position of the shift linkage. A speed sensor senses speed of the engine. A control circuit compares the speed of the engine to a stored engine speed and modifies, based upon the position of the shift linkage when the speed of the engine reaches the stored engine speed, a neutral state threshold that determines when the control circuit ceases reducing the speed of the engine to facilitate a shift change.

U.S. Pat. No. 9,103,287 discloses drive-by-wire control systems and methods for a marine engine that utilize an input device that is manually positionable to provide operator inputs to an engine control unit (ECU) located with the marine engine. The ECU has a main processor that receives the inputs and controls speed of the marine engine based upon the inputs and a watchdog processor that receives the inputs and monitors operations of the main processor based upon the inputs. The operations of the main processor are communicated to the watchdog processor via a communication link. The main processor causes the watchdog processor to sample the inputs from the input device at the same time as the main processor via a sampling link that is separate and distinct from the communication link. The main processor periodically compares samples of the inputs that are simultaneously taken by the main processor and watchdog processor and limits the speed of the engine when the samples differ from each other by more than a predetermined amount.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a system for controlling propulsion of a marine vessel by a marine drive is provided, the marine drive having a marine engine that effectuates rotation of propulsor through a shift system that shifts amongst at least a forward gear position, a reverse gear position, and a neutral position. The system includes a remote control having a lever movable to provide a throttle demand input for controlling the marine engine and a shift demand input for controlling the shift system. A shift demand sensor measures a shift demand lever position to provide the shift demand input, and a throttle demand sensor measures a throttle demand lever positions to provide the throttle demand input. A control module is configured to detect shift demand sensor failure based on the shift demand lever position sensor values and assign a predetermined throttle demand lever position as shift command position. When the throttle demand lever position reaches the shift command position, a shift command is generated instructing a change in gear position of the shift system.

A method of controlling a marine drive is provided, the marine drive having a marine engine that effectuates rotation of a propulsor through a shift system that shifts amongst at least a forward gear position, a reverse gear position, and neutral position. The method includes receiving a shift demand lever position from at least one shift demand sensor, and receiving a throttle demand lever position for at least one throttle demand sensor. Failure of the shift demand sensor is detected, and then a predetermined throttle demand lever position is assigned as a shift command position. A shift command is generated instructing a change in gear position of the shift system in the marine drive when the throttle demand lever position reaches the shift command position.

Various other features, objects, and advantages of the invention will be made apparent from the following description taken together with the drawings.

BRIEF DESCRIPTION OF THE DRAWINGS

The present disclosure is described with reference to the following FIGURES.

DETAILED DESCRIPTION

Many marine propulsion systems have user control devices in the form of remote controls with moveable levers that control engine throttle and shift position. In many such embodiments, the remote control is not physically linked to the throttle system (e.g. a throttle valve, spark control, and/or fuel injection system) and shift system (e.g., a clutch system), but at least some portion of the communication between the remote control and the throttle and shift systems is performed via digital systems and controls. In certain embodiments, mechanical links may connect the remote control to sensor at or near the marine drive, and thus movement of the mechanical lever on the remote control is transferred through cables where it is sensed remotely at or near the marine drive. The sensed lever position is then communicated, such as through a control module, to actuators actuating the respective throttle and shift systems. Examples of such embodiments are depicted and described with respect to FIGS. 1 and 2. In other embodiments, the lever position of the remote control may be sensed at the remote control itself, and such information is digitally communicated, such as via a controller area network (CAN) bus or other digital communication means, to a control module, which in turn controls the respective shift and throttle actuation systems.

In either embodiment, the function of the propulsion control system is reliant on proper function of the shift demand sensor(s) and throttle demand sensor(s) in order to receive operator input to control the shift and throttle, respectively, of the marine drive. If the shift demand sensor fails, for example, then no shift demand from the operator can be received and thus the operator will be unable to control the gear position of the marine drive. Accordingly, the system will be inoperable to control propulsion, or propulsion control will be severely limited. In many prior art systems, the marine drive retains the last valid commanded gear, and thus when a shift demand lever position sensor fails the operator is latched in whatever gear they were in at the time of failure with no ability to shift the engine. In certain embodiments, the gear position of the marine drive shifts to neutral when the marine drive is turned off and restarted, such as by shifting to neutral during crank. There, the operator is then locked in neutral with no ability to engage the propeller to propel the marine vessel.

Accordingly, the inventors recognized a need for a control system and method that enables at least limited shifting control by an operator in the event that the shift demand lever position sensor fails. In recognition of the forgoing need, problems, and challenges, the inventors developed the control strategy disclosed herein which utilizes the existing throttle demand sensor(s) to provide a modified shift control. Specifically, one or more throttle demand lever positions sensed by the throttle demand sensor(s) are assigned as shift command positions, such that a shift command is generated to change a gear position of the shift system when the control lever of the remote control reaches the shift command position. The throttle demand inputs associated with the lever positions may also be adjusted to accommodate the shift control strategy, as well as to limit the output of the engine and force operation of the marine drive in a lower power "limp home" mode. Thereby, limited control and operation of the marine drive can be provided so that a vessel operator is not stranded upon shift demand sensor failure, but can continue sufficient operation in order to reach port.

Figure 1:
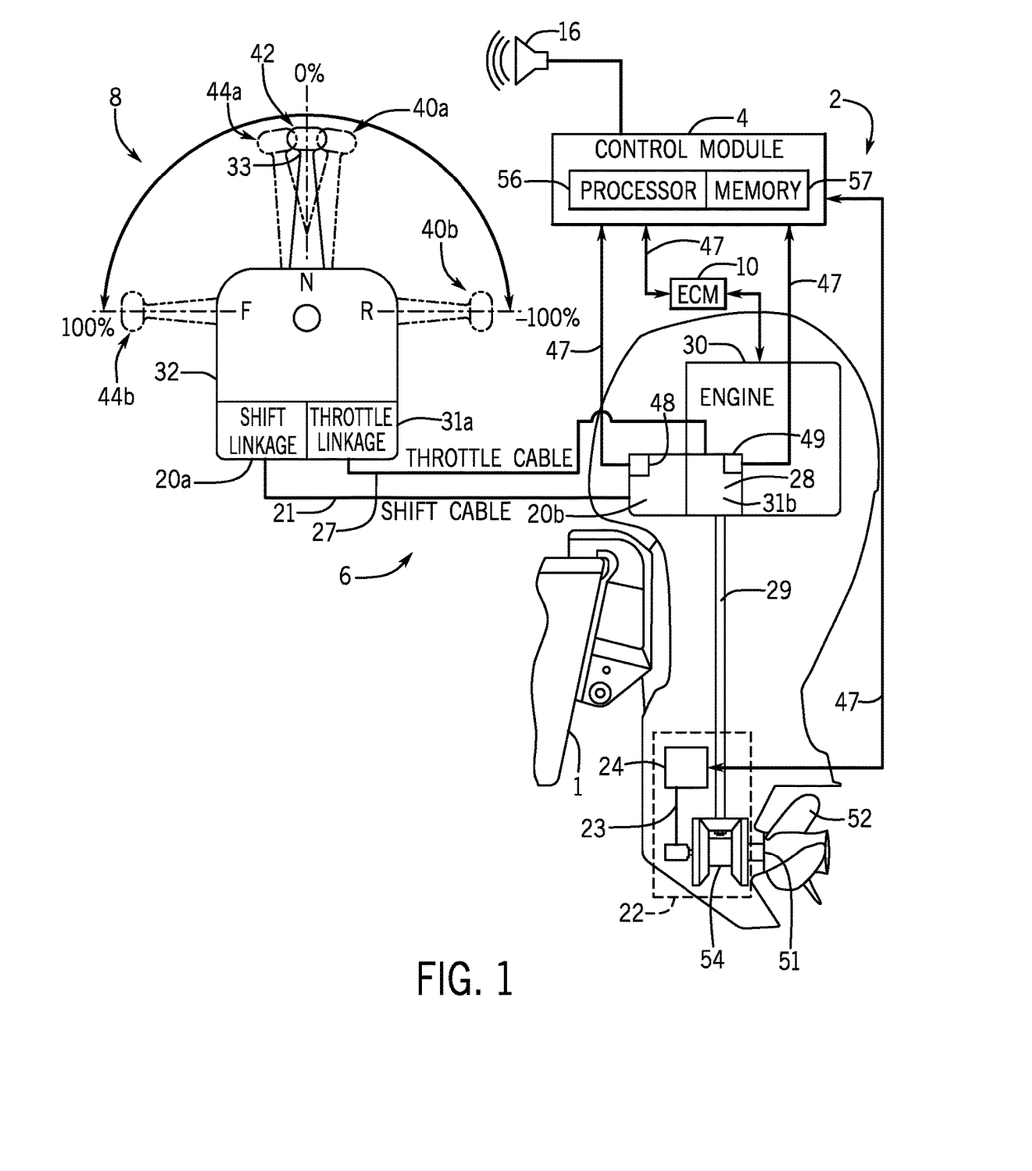
FIG. 1 schematically depicts a propulsion control system according to one embodiment of the disclosure.

FIG. 1 depicts an exemplary propulsion control system 6 for a marine drive 2 on a marine vessel 1. In the examples shown and described, the marine drive 2 is an outboard motor; however, the concepts of the present disclosure are not limited for use with outboard motors and can be implemented with other types of marine drives, such as inboard motors, inboard/outboard motors, hybrid electric marine propulsion systems, pod drives, and/or the like. In the examples shown and described, the marine drive 2 has a marine engine 30 causing rotation of a drive shaft 29 to thereby cause rotation of a propeller shaft 51. A propeller 52 connected to and rotating with the propeller shaft 51 propels the marine vessel 1 to which the marine drive 2 is connected. The direction of rotation of the propeller shaft 51 and propeller 52 is changeable by a shift system 22, or gear system. In the example shown, the shift system 22 includes a clutch 54, and more specifically a conventional dog clutch. The clutch 54 is actuated between a forward gear position, a neutral position, and a reverse gear position by a shift rod 23. In the neutral state, the clutch 54 is in a position between the forward and reverse gear positions but is not engaged with either gear, and thus no power is transmitted from the marine engine 30 to the propeller shaft 51. Other types of clutches may equally be employed. In other embodiments, the shift system 22 may include a transmission which may control the rotational connection between the drive shaft 29 and the propeller shaft 51 and may engage multiple forward and/or reverse gears.

The propulsion control system 6 also includes a remote control 8 having a base 32 and a control lever 33 extending therefrom. In the example of FIG. 1, the remote control 8 is a combination shift/throttle controller with control lever 33 pivotally movable between a range of reverse positions 40 between a reverse detent position (zero throttle) 40a and a reverse maximum (or wide open throttle) position 40b, a center position 42, and a range of forward positions 44 between a forward detent position (zero throttle) 44a and a forward maximum (or wide open throttle) position 44b, as is conventional. The remote control 8 is typically located at the helm of the marine vessel 1. For example, the remote control 8 may be a console-mount remote control. In other embodiments, the throttle and shift controls may be separated into different remote control elements, and a person having ordinary skill in the art will understand in view of this disclosure that the disclosed control strategy may be implemented with equal effect in such a system.

The propulsion control system 6 also includes a control module 4 that is programmable and includes a processor 56, such as a microprocessor, and memory 57. The control module 4 can be located anywhere with respect to other components of the propulsion control system 6 and/or located anywhere on the marine vessel 1 and can communicate with various components on the marine vessel 1 via wired and/or wireless links, as will be explained herein below. Although FIG. 1 shows a single control module 4, the propulsion control system 6 can include more than one control module 4, or control circuit. For example, the propulsion control system 6 may have a control module 4 located at or near the control lever 33 and can also have a control module 4 located at or near the marine drive 2. Each control module 4 can have one or more control functions and may cooperate, and one having ordinary skill in the relevant art will recognize that the control module 4 may have many different forms and is not limited to the example that is shown and described. For example, the control module 4 may provide engine control instructions, or it may communicate with a separate engine control module (ECM) that controls the marine engine 30.

The control module 4 may comprise a microprocessor and other circuitry that retrieves and executes software from memory 57. A person having ordinary skill in the relevant art will understand in light of the present disclosure that the control module 4 can be implemented with a single processing device or may be distributed across multiple processing devices or sub-systems that cooperate to execute the control methods described herein. The memory 57 may comprise any storage media, or group of storage media, readable by the processor 56, which may be any processing device, or combination of processing devices. For example, the memory 57 may include volatile and/or non-volatile, removable and/or non-removable media implemented in any method or technology for storage of information, such as computer-readable instructions, data structures, program modules, or other data. Memory 57 may be implemented as a single storage device, or may be implemented across multiple storage devices or sub-systems. The processor 56 may be, for example, a general purpose central processing unit, an application specific processor, a logic device, or any other type of processing device or combination thereof.

In the depicted example, the control module 4 communicates with the marine engine system, which in the depicted embodiment includes the marine engine 30 and associated engine control module (ECM) 10 for the marine drive 2. The marine engine 30 may be, for example, a diesel or a gasoline internal combustion engine.

In the depicted embodiment, operator control of the output of the marine engine 30 is provided through the control module 4 to the ECM 10, which then controls the various inputs to the marine engine 30, such as air, fueling and spark. In certain embodiments, communication between the control module 4 and the ECM 10 may be a two-way communication via a communication link 47, wherein the ECM 10 may communicate various engine control values and/or sensed engine values to the control module 4. For example, the ECM 10 may receive and communicate a current engine speed for the marine engine 30 to the control module 4. Similarly, the control module 4 may dictate an engine speed setpoint for the marine engine 30 to the ECM 10. The control module 4 generally communicates various high level commands to the ECM 10, such as including throttle demand values according to operator input at the remote control 8.

The communication link 47 may be a wired electrical transmission line, or may be a wireless communication link between wireless receiver/transmitters employing any known wireless communication protocol. In one example, the communication link 47 between various aspects of the control system is a controller area network (CAN) bus, but other types of digital or analog communication links could be used. It should be noted that the communication link lines depicted in FIG. 1 are meant only to demonstrate that the various system elements are capable of communicating information to or with one another, and do not represent actual wiring connections between the various elements, nor do they represent the only paths of communication between the elements. Additionally, the system 6 may incorporate various types of communication devices and system, and thus illustrated communication links 47, may in fact represent various separate and/or different types of wireless and/or wired data communication systems.

Figure 2:
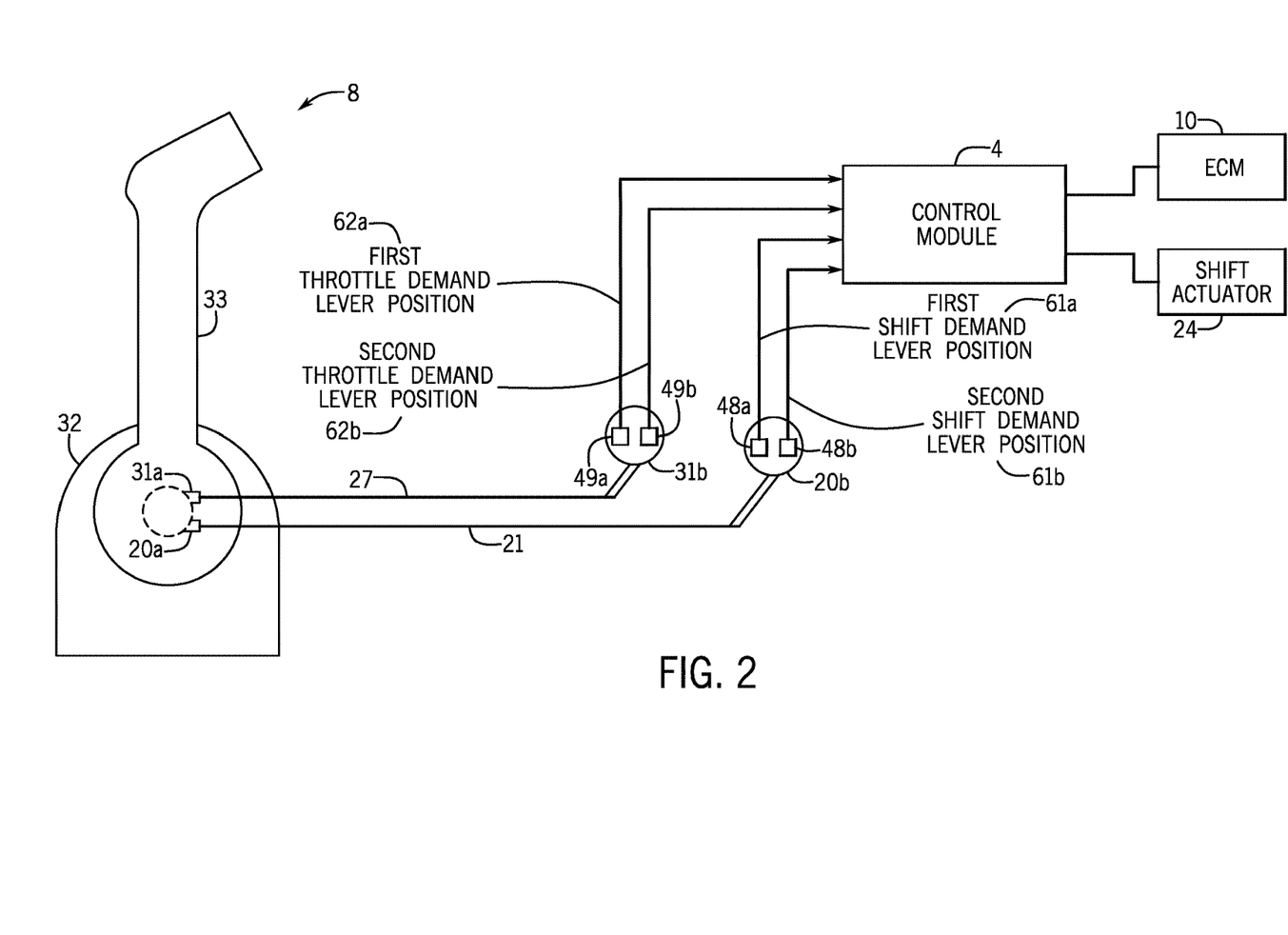
FIG. 2 is a schematic depiction of a control arrangement translating commands from a remote control to aspects of a marine drive according to an embodiment of the disclosure.

FIG. 2 schematically depicts an exemplary embodiment of a control arrangement having a control module 4 that receives shift and throttle input from the remote control 8 and communicates corresponding shift and throttle commands to the shift actuator 24 and the ECM 10. The operator provides control inputs to the system 6 by moving the control lever 33 of the remote control 8. In the depicted embodiment, mechanical shift linkages connect the lever 33 to the shift and throttle sensing systems located at the marine drive 2. In the example, the control lever 33 is operably connected to a shift linkage 20 and shift cable 21 such that pivoting the control lever 33 forward or back causes corresponding movement of the shift linkages 20a and 20b. Specifically, portions of the shift linkage 20 are located at the remote control 8, and other portions 20b of the shift linkage 20 are connected to one or more shift demand sensors 48 (e.g. 48a and 48b), which may be inside or near the housing of the marine drive 2. A shift cable 21 connects between the shift linkage portions 20a and 20b to translate motions there between and ultimately translates movement of the control lever 33 to the one or more shift demand sensors 48. For example, the shift cable 21 may be a galvanized steel cable, a linkage, or similar connecting device or element. In one example, the shift linkage 20b may be a lever moved by the shift cable 21. Position sensors 48a and 48b then detect the position of the shift linkage 20b in order to measure a shift demand lever position, and thereby to provide a corresponding shift demand input to the shift system 22. The measured shift demand lever position sensed by the shift demand sensors 48a and 48b is then communicated to the control module 4, which then communicates with the shift actuator 24 in order to effectuate the demanded shift position. For example, the shift actuator 24 may move the shift rod 23 in order to change the gear position of the clutch 54.

Similarly, a throttle linkage 31 and throttle cable 27 may translate movement of the control lever 33 to the throttle demand sensor(s) 49. Specifically, portions 31a of the throttle linkage 31 are located at the remote control, and connected to the control lever 33, and other portions 31b of the throttle linkage 31 are connected to one or more throttle demand sensors 49 (e.g. 49a and 49b), which may be located on or near the marine drive 2. A throttle cable 27, or throttle link, connects between the throttle linkage portions 31a and 31b to translate movement there between and ultimately to translate movement of the control lever 33 to the throttle demand sensors 49, which then measure and communicate a throttle demand lever position to the control module 4. The throttle cable 27 may be of similar construction as described above with respect to the shift cable 21. The control module 4 may then communicate corresponding throttle demands to the ECM 10, which then carries out the corresponding engine controls, such as to control a throttle valve system, fuel injection system, and/or spark system in order to effectuate the throttle demand, which may be demanded engine thrust or engine speed.

With reference also to FIG. 1, the rotational position of the control lever 33 may vary between a reverse maximum position 40b, or reverse wide open throttle, and a forward maximum position 44b, or forward wide open throttle. In accordance with the system described above, the rotational position of the control lever 33 is sensed by both the shift demand sensor(s) 48 and the throttle demand sensor(s) 49. For example, the respective sensors 48, 49 may operate to measure a shift demand lever position 61 and a throttle demand lever position 62, respectively, such as at predetermined intervals. For example, the shift demand sensor(s) 48 and the throttle demand sensor(s) 49 may be an angular position sensor, and may provide an analog output or a digital output. For example, the demand sensors 48, 49 may be Hall Effect sensors, programmable magnetic encoders, potentiometers, rotary encoders, clinometers, or the like. Furthermore, the respective demand sensors 48, 49 may be arranged as incrementing sensors or decrementing sensors. In one embodiment, a first shift demand sensor 48a is arranged as an incrementing sensor and a second shift demand sensor 48b is arranged as a decrementing sensor. First and second throttle demand sensors 49a and 49b may be provided and arranged similarly.

In one embodiment, the measurements by the two shift demand sensors 48a and 48b may be compared, and likewise the measurements from the two throttle demand sensors 49a and 49b may be compared. Thereby, the integrity of and confidence in the measurements from the respective demand sensors can be increased. In such an embodiment, the measurement values of each demand sensor 48a-48b and 49a-49b are each expected to be within an acceptable measurement range, and the difference between the measurements of the like sensors (i.e. between the shift demand sensors 48a and 48b and between the throttle demand sensors 49a and 49b) is expected to remain less than an acceptable difference threshold. To provide just one example, an acceptable measurement range for the demand sensors 48 and 49 could be between 0.1 volts and 4.9 volts, and if measurements from one of the demand sensors 48, 49 falls outside of the acceptable measurement range then a sensor fault is detected.

The difference check may also be provided to provide fault detection where a sensor measurement is off, or inaccurate, but the measured values do not fall outside the acceptable measurement range window. In that instance, a significant difference will be present in the respective shift demand lever positions 61a and 61b measured by the shift demand sensors 48a and 48b, or between the throttle demand lever positions 62a and 62b measured by the throttle demand sensors 49a and 49b. To provide just one example, an acceptable difference threshold may be 0.25 volts, such that if the absolute value of the difference between the respective demand sensors 48a and 48b, or 49a and 49b exceeds that value then sensor failure is detected. Once the difference in measurements exceeds the acceptable difference threshold, a sensor failure is detected, as neither sensor in the set of shift demand sensors 48a and 48b or set of throttle demand sensors 49a and 49b can be trusted once the threshold is exceeded.

In one exemplary embodiment, shift demand sensor failure may be detected where either of the shift demand sensors 48a or 48b exceed the acceptable measurement range, or an absolute value of the difference between measurements from the sensors exceeds the acceptable difference threshold. In other embodiments, shift demand sensor failure may only be detected where the difference exceeds the acceptable difference threshold or both the shift demand sensors 48a and 48b are measuring shift demand lever positions 61a and 61b outside of the acceptable measurement range. Accordingly, in such an embodiment, if failure of one sensor is detected, then the difference may be ignored and the other sensor may be relied upon to provide shift demand input in order to control the shift system 22 (so long as the remaining sensor continues to provide position measurements within the acceptable measurement range).

Figure 3A:
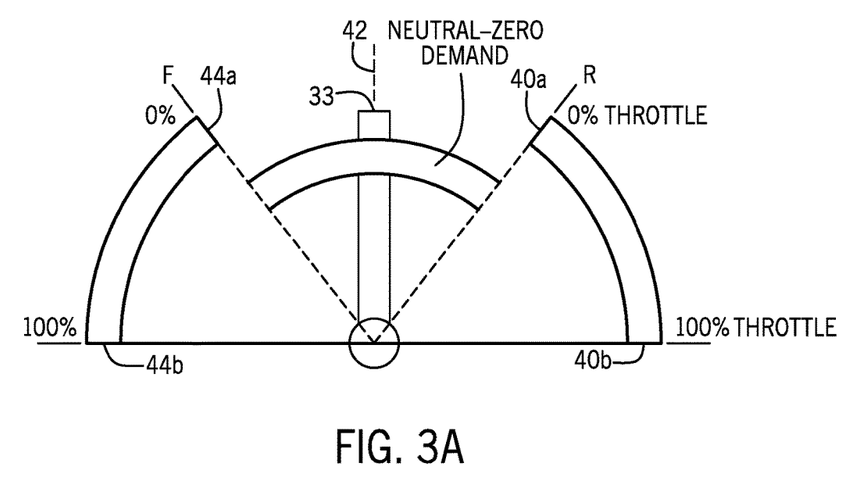
FIGS. 3A and 3B schematically depict control arrangements for a remote control, with FIG. 3 representing an exemplary control strategy during normal operation of the shift demand sensor and FIG. 3B depicting the control strategy after failure of the shift demand sensor according to an embodiment of the disclosure.
Figure 3B:
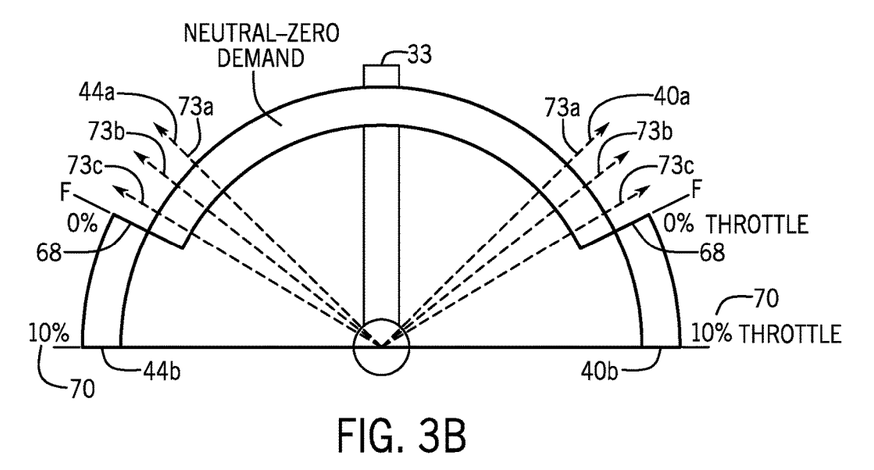

When shift demand sensor failure is detected, the disclosed control strategy is employed in order to utilize the throttle demand sensor(s) 49 to provide a modified shift control. Specifically, one or more throttle demand lever positions 62 are assigned as shift command positions, such that when the lever 33 is measured as being at that shift command position a command is generated to change a gear position of the shift system 22. FIGS. 3A and 3B exhibit this change in control function, where FIG. 3A depicts normal operation of a control system based on input from both shift demand sensors 48 and throttle demand sensors 49 measuring position of the control lever 33; and FIG. 3B depicts the modified control operation where input from the throttle demand sensor(s) 49 is utilized to provide both the throttle demand input and the shift demand input (and no input is received from any shift demand sensor 48).

As exemplified in FIG. 3A, during normal operation of the remote control (i.e. when all demand sensors 48, 49 are working properly, the control lever 33 can be moved to the reverse detent position 40a in order to generate a shift command instructing the shift system 22 to change its gear position from neutral to reverse (or vice versa). Similarly, the control lever 33 can be moved to the forward detent position 44a in order to generate a shift command instructing a change in the gear position of the shift system 22 from neutral to a forward gear position (or vice versa). Thus, a range of lever positions between the reverse detent position 40a and the forward detent position 44a are associated with maintaining the shift system 22 in the neutral position, where neither the reverse nor forward gears are engaged.

For purposes of the shift command, the position of the control lever 33 is determined based on the shift demand lever position(s) 61 generated by the shift demand sensor(s) 48. The control lever 33 is then moved toward the respective maximum position 40b, 44b to increase the throttle demanded. Such throttle demand input is determined based on the throttle demand lever position(s) 62 measured by the throttle demand sensor(s) 49. For example, the throttle demand lever position(s) 62 may be associated with a throttle demand amount between 0%, applied at the respective detent position 40a and 44a, to requesting 100% of the output capability from the marine engine 30 at the respective maximum positions 40b, 44b. Each throttle demand lever position 62 may be, for example, a percentage between 0%, associated with the detent positions 44a and 40a, and 100%, associated with the respective maximum positions 40b and 44b. Each such throttle demand lever position 62 between 0% and 100% may then be associated with a throttle demand input, such as values between and idle setting for engine speed and/or engine torque and a maximum engine speed and/or engine torque for which the engine 30 is rated to output. In certain embodiments, the throttle demand sensor(s) 49 may only be configured to provide positive position measurements between the detent positions 44a and 40a and the respective maximum position 40b and 44b (e.g. between 0% and 100% of the range where a throttle command is actuated), and thus is unable to differentiate between forward and reverse throttle demands. In such embodiments, the system 6 relies on the shift demand sensor(s) 48 to determine whether the control lever 33 is in the reverse position ranges 40a-40b or the forward position ranges 44a-44b, and the throttle demand input is then implemented accordingly.

When a shift demand sensor fault is detected, measurements from the one or more shift demand sensors 48 can no longer be used to provide shift demand input for controlling the shift system. In that situation, the disclosed control system is engaged where a predetermined throttle demand lever position is assigned as a shift command position 68. The shift command position 68 is associated with generating a shift command instructing the shift system 22 to change gear positions, such as from the neutral position to the forward gear position or vice versa. Thus, when the throttle demand lever position(s) 62 sensed by the throttle demand sensor(s) 49 reaches the shift command position 68, the control module 4 determines that a shift command should be generated, and thereby instructs the shift actuator 24 accordingly.

In embodiments where the throttle demand sensor(s) 49 are only configured to measure a positive range of shift positions between the detent positions 44a and 40a and the respective maximum positions 40b, 44b, and thus cannot differentiate between the reverse demand direction and the forward demand direction, the system may only be capable of sending shift commands to instruct the shift system 22 to change between the neutral position and the forward gear position (or vice versa, depending on the direction of movement). In such an embodiment, moving the lever in either direction (i.e., in either the direction normally associated with reverse throttle commands or in the direction normally associated with forward throttle commands) generates a forward shift command when the predetermined throttle lever position 62 reaches the shift command position 68 because the throttle demand lever position 62 outputted by the throttle demand sensor 49 is identical in either of the two movement directions.

In other embodiments, the throttle demand sensors(s) 49 may be configured to differentiate between movements of the control lever 33 amongst the forward gear throttle range versus the reverse gear throttle range. In such an embodiment, the shift command position 68 in the reverse gear range (i.e. between the center position 42 and the maximum forward position 44b) can be associated with a shift command instructing the shift system 22 to shift between the reverse gear position and the neutral position (or vice versa, depending on the direction of movement). Alternatively or additionally, the throttle demand sensor(s) 49 may be configured to sense a wider range of positions than between the detents 40a, 44a and the maximums 40b, 44b. For example, the throttle demand sensor(s) 49 may be configured to sense the entire range of lever positions between the maximums 40b and 44b, including the neutral range between the detents 40a, 44a (such as when position sensors detect the control lever 33 position directly, like in a drive-by-wire arrangement referred to herein).

It may be preferable that the shift command position 68 is different than the detent positions 40a and 44a. Accordingly, the predetermined throttle demand lever position 62 associated with the shift command position may be a greater position (i.e., closer to the respective maximum position 40b, 44b) than the throttle demand lever position 62 associated with the location of the detent positions 40a, 44a. To provide just one example, the shift command position 68 could be assigned to a predetermined throttle demand lever position 62 of 30% of the maximum positions 40b, 44b; however, predetermined throttle demand lever positions 62 that are smaller or larger than that may be appropriate for given systems.

Setting the shift command position 68 to be significantly different than the detent positions 40a and 40b may provide an additional benefit in that an operator will recognize that the propulsion control system 6 is operating in a different control mode than the normal operation mode with respect to the remote control. This can generate awareness of the problem by the operator, which can facilitate provision of proper command instructions by the operator given the context of the failed shift demand sensor(s) 48. An alert, such as an auditory alert, may also be generated such as by a speaker 16 at or near the helm on the marine vessel, upon detection of the shift demand sensor failure. Alternatively or additionally, alerts may be generated based on movement of the control lever 33, such as to inform an operator that the demand inputs generated by movement of the control lever 33 are not the same as in normal control mode operation of the propulsion control system 6. For example, one or more predetermined throttle demand lever positions 62 may be assigned as alert command positions such that when the control lever 33 reaches the respective alert command position 73 the control module 4 generates an alert to the operator, such as an auditory alert via the speaker 16. Alternatively or additionally, the control module 4 may control a display at the helm, and the generated alert may include a visual alert provided on that display.

As depicted in FIG. 3B, multiple alert command positions (e.g. 73a-73c) may be assigned such that progressive alerts are generated. For example, progressively louder and/or faster auditory alerts may be generated as the control lever 33 is moved toward one of the maximum positions 40b, 44b. In the example, three alert command positions 73a-73c are assigned at predetermined throttle demand lever positions 62 between the detent position 40a and the shift command position 68. Each alert command position 73a-73c may be associated with a differing alert, and such alerts may become progressively louder and/or faster as the control lever 33 moves toward the respective maximum position 40b, 44b. For example, a first alert command position 73a may be assigned at the throttle demand lever position 62 associated with the detent positions 40a, 44a. Thus, when the measured throttle demand lever position 62 from the throttle demand sensor 49 reaches the first alert command position 73a, a first auditory alert may be generated, such as a slow beat (e.g., occurring at a period of one second or two seconds). As the control lever 33 is moved toward a respective maximum position 40b, 44b, it then crosses a second alert command position 73b associated with a faster beep alert (e.g., such as twice as fast as the first beep alert). As the control lever 33 progresses further toward the respective maximum position 40b or 44b, the third alert command position 73c is reached upon which the auditory alert may be an even faster beep or may be a constant alert sound. The third alert may be continued until the control lever 33 reaches the shift command position 68. In other embodiments, each alert may be generated for a predetermined amount of time.

In certain embodiments, in order to guarantee that an alert is generated even where the control lever 33 is moved very quickly through the respective alert command positions 73a-73c, the control algorithm may be configured such that at least a predetermined alert is generated prior to generating the shift command as a result of reaching the shift command position 68. This forces at least a minimum alert generation to the operator regardless of how quickly the control lever 33 is moved. For example, crossing one or more of the alert command positions 73a-73c may trigger generation of a predetermined alert executed regardless of the subsequent throttle demand lever position 62 received at the control module 4.

In certain embodiments, the throttle demand input associated with the various lever positions of the control lever 33 may be remapped upon detecting failure of the shift demand sensor(s) 48. For example, a reduced throttle demand limit may be imposed to reduce the maximum throttle demand input value communicated to the ECM 10, which could be imposed as reduced engine speed command or a reduced engine torque command. Thus, the output of the marine engine 30 in this mode would be limited, allowing the operator to get the marine vessel 1 back to port, but preventing continued high speed operation of the propulsion control system 6. For example, the throttle inputs may be remapped such that throttle demand positions between the center position 42 and the shift command position 68 are associated with a zero throttle demand, or an engine speed and/or engine torque associated with an idle set point for the marine engine 30.

Figure 4:
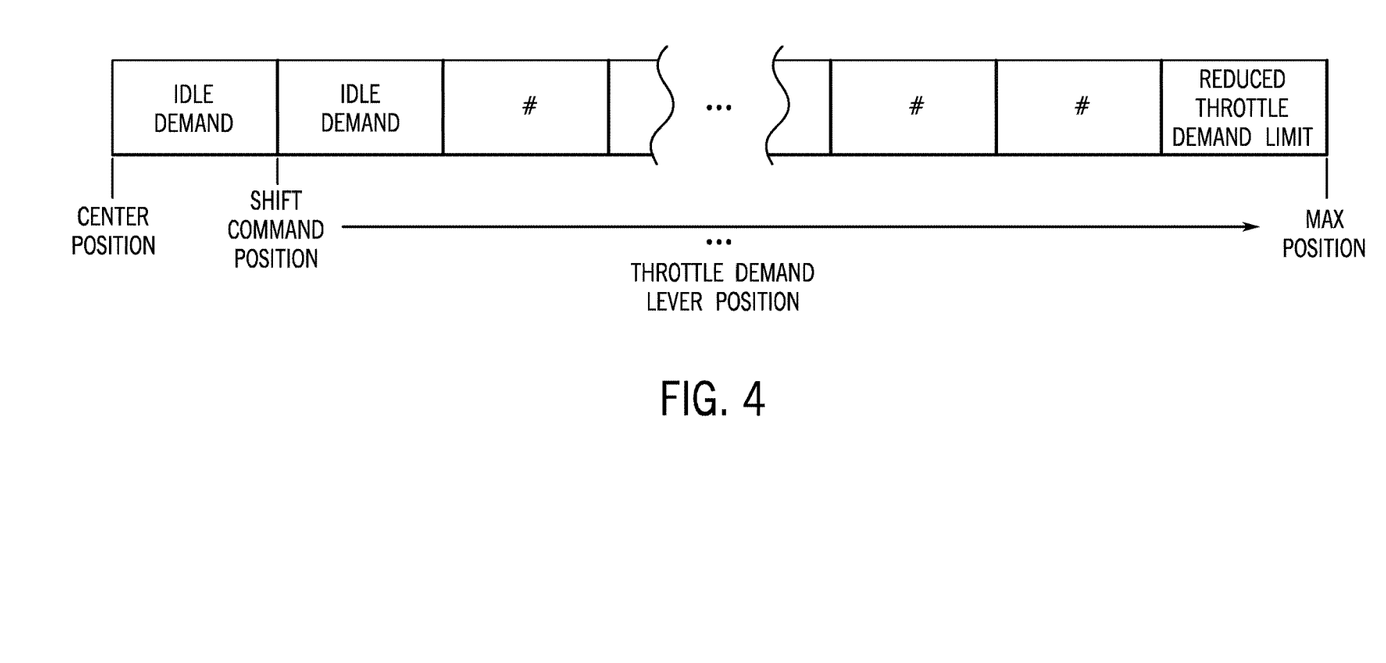
FIG. 4 schematically represents an exemplary reduced demand lookup table.

The throttle demand lever positions 62 between the shift command position 68 and the maximum position 40b, 44b are remapped to be associated with throttle demand inputs between the idle set point, or 0%, and the reduced throttle demand limit, which may be a certain percentage of the normal maximum demand limit for the engine. To provide just one example, the reduced throttle demand limit may be equal to 10% of the maximum demand limit during normal operation. For example, the control module may have stored and accessed a reduced demand look up table correlating throttle demand lever positions 62 with throttle demand inputs, which may be configured such that throttle demand lever positions 62 between the shift command position 68 and the maximum lever position 40b, 44b are associated with a range of throttle demand inputs between 0 throttle demand, or an idle set point for the engine, and the reduced throttle demand limit. FIG. 4 schematically depicts and exemplary embodiment of such a reduced demand look up table. Throttle demand lever positions 62 between the center position 42 for the control lever 33 and the shift command position 68 are associated with an idle set point for the engine, or a 0% throttle demand. The table is ordinated such that increasing throttle demand inputs are provided as the control lever 33 moves from the shift command position 68 towards the maximum position 40b, 44b, and the reduced throttle demand limit is produced as the throttle demand input at a lever position prior to the maximum position 40b, 44b.

Figure 5:
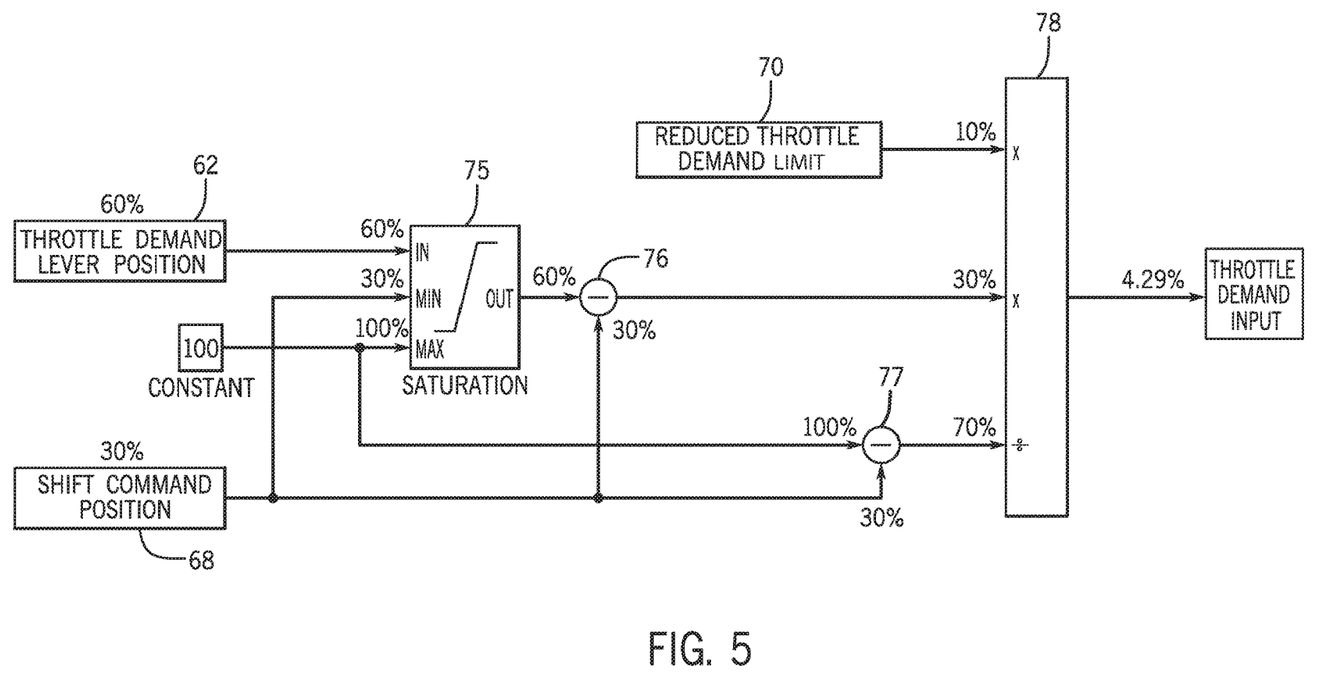
FIG. 5 schematically represents and exemplary reduced demand formula.

In other embodiments, the throttle demand input is a calculated value based on the throttle demand lever position 62, and a reduced demand formula is used to calculate the throttle demand input when operating in the failure mode to compensate for the shift demand sensor failure. FIG. 5 schematically depicts one embodiment of a reduced demand formula. In the depicted example, the throttle demand lever position 62 is supplied to a dynamic saturation block 75. The dynamic saturation block 75 adjusts, or filters, the throttle demand lever position 62 to be between a minimum equal to the shift command position 68 and a maximum value. In the depicted embodiment, the shift command position 68 is 30% and the maximum value is 100%, and thus the output of the dynamic saturation block 75 is always between 30% (any throttle demand lever position 62 at or below 30% is outputted as 30%) and 100%. The shift command position 68 value is then subtracted from the output of the dynamic saturation block 75, represented at node 76. Thus, any inputted throttle demand lever position 62 at or below the shift command position 68 (3.g., at or below 30%) will result in a 0% output from node 76. In the depicted example, the throttle demand lever position 62 happens to be 60%, thus resulting in a 30% output from node 76. At node 77, the shift command position 68 value is subtracted from the maximum value, thus accounting for the change in possible throttle range in the revised strategy. The output of nodes 76 and 77 is passed as input to the multiply/divide block 78, along with the reduced throttle demand limit 70. At block 78, the reduced throttle demand limit 70 (which in the depicted embodiment is 10%) is multiplied by the output from node 76 (which in the example is 30%). That value is then divided by the output of node 77 (which in the depicted embodiment is 70%). The resulting throttle demand input calculated using the exemplary reduced demand formula is 4.29%.

In the embodiments depicted in FIGS. 1 and 2, the connection between the control lever 33 and the control module 4 is a hybrid mechanical and electrical/digital communication system. A person having ordinary skill in the art will understand in view of this disclosure that the disclosed control methods may be equally implemented using a fully electronic, drive-by-wire system, as described above. In such a drive-by-wire system, one or more position sensors are in the remote control 8 measuring the position of the control lever 33 and communicating that position to the control module 4. Such electronic throttle and shift control systems are well known in the art, an example of which is disclosed at U.S. Pat. No. 9,103,287 which has been incorporated herein by reference. The disclosed control methods and systems may be implemented on such a drive-by-wire system where the remote control 8 includes both a shift demand sensor 48 for providing shift demand input and a throttle demand sensor 49 for providing throttle demand input. Thus, if the shift demand sensor 48 fails, then the throttle demand sensor 49 can be used to provide both the shift demand input and the throttle demand input as described herein.

Figure 6:
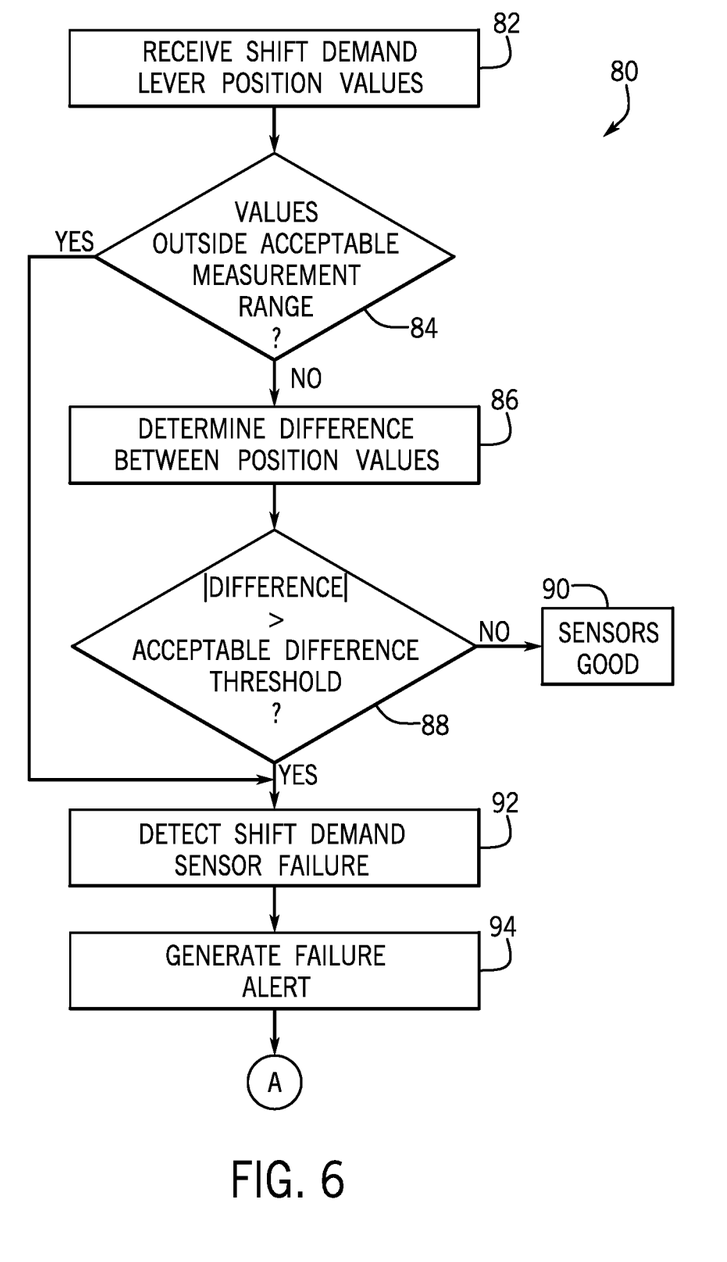
FIGS. 6-7 are flow charts depicting embodiments of methods, or portions thereof, of controlling a marine drive.
Figure 7:
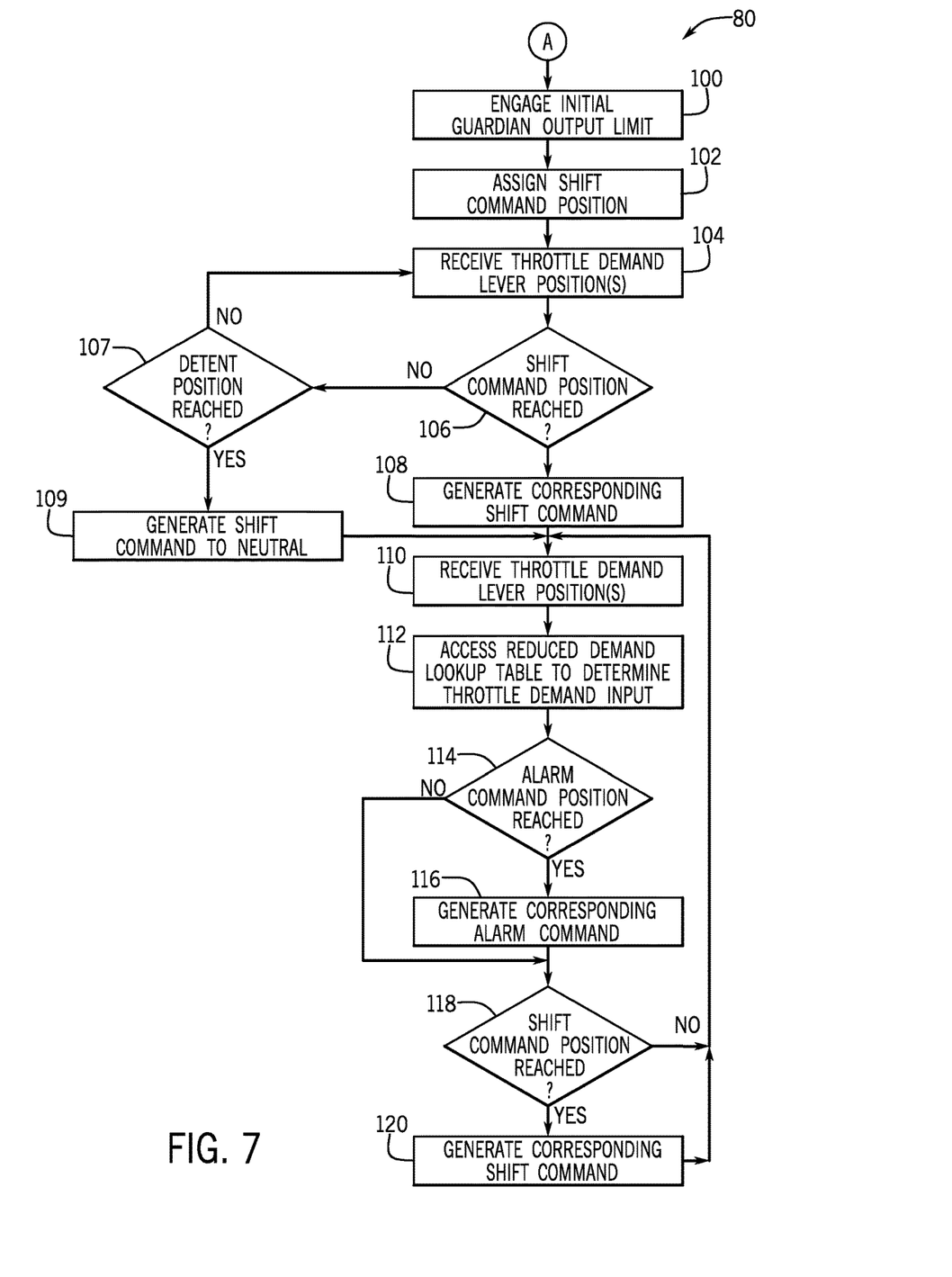

FIGS. 6-7 depict embodiments of methods 80, or portions thereof, for controlling a marine drive 2 according to the present disclosure. As will be generally understood by a person having ordinary skill in the art, the method steps represented at FIGS. 6-7 may be carried out by executing control software instructions stored in memory 57 on the processor 56. The methods described herein may be implemented with one or more computer programs executed by one or more processors 56, and several processors may operate as part of a single control module. The computer programs include processor-executable instructions that are stored on a memory 57 comprised of a non-transitory tangible computer readable medium. The computer programs may also include stored data, such as data in the form of lookup tables. As used herein, the term module may refer to or include an application-specific integrated circuit (ASIC), an electronic circuit, a combinational logic circuit, a field programmable gate array (FPGA), a processor (shared, dedicated, or group) that executes stored code as described herein, or other suitable components that provide the described functionality. The term code, as used herein, may include software, firmware, and/or microcode, and may refer to programs, routines, functions, classes, and/or objects.

FIG. 6 depicts exemplary steps for detecting shift demand sensor failure. Shift demand lever position values are received at step 82, such as from the first shift demand sensor 48a and second shift demand sensor 48b. The system then compares the first shift demand lever position values 61a, 61b to an acceptable measurement range at step 84. If either of the first shift demand lever position 61a or second shift demand lever position 61b are outside of the acceptable measurement range, then a shift demand sensor failure is detected at step 92. In other embodiments, step 84 may require that both the first shift demand lever position 61a and the second shift demand lever position 61b are outside of the acceptable measurement range before detecting the shift demand sensor failure.

In certain embodiments, a difference check may also be performed, where a difference between the first and second shift demand lever position values 61a, 61b is determined at step 86. An absolute value of the difference is compared to an acceptable difference threshold at step 88. In other embodiments, the difference threshold may be a range between a negative value and a positive value, and thus determining the absolute value of the difference is unnecessary. If the acceptable difference threshold is not exceeded at step 88 then the sensors are deemed accurate at step 90 and normal control operation is performed based on the shift demand lever position measurements 61a, 61b. If, on the other hand, the acceptable difference threshold is exceeded at step 88, then the shift demand sensor failure is detected at step 92. Once the shift demand sensor failure is detected, a failure alert is generated at step 94, which may include triggering an audio alert via the speaker 16 and/or a visual alert via a display, such as a display at the helm of the marine vessel 1.

FIG. 7 depicts an exemplary embodiment of method steps for controlling shift and throttle inputs once a shift demand sensor failure has been detected. In this example, an initial guardian output limit is engaged at step 100, which is an initial engine output limit based on the detection of the sensor failure. The initial guardian output limit could be set to any value below the normal maximum output limit for the engine 30. To provide just one example, the initial guardian output limit could be 50% of the normal maximum output for the marine engine 30. This could be implemented in any of several ways. For example, the initial guardian output limit could be applied as a latched value, such that all throttle demand inputs above a particular amount are reduced to the initial guardian output limit. This would act to latch the output of the marine engine 30 to a maximum value, but all throttle demand inputs associated with engine outputs below the initial guardian output limit could be implemented normally. In another embodiment, all throttle demand inputs could be reduced proportionally to the reduction from the maximum output limit to the initial guardian output limit. Thus, where the exemplary initial guardian output limit is 50% of the normal maximum, all throttle demand inputs could be reduced by 50%. In another example, the initial guardian output limit could be an idle setpoint for the marine engine 30, thereby forcing idle and encouraging the operator to move the control lever 33 into the neutral position range. In still other embodiments, step 100 could be eliminated, and the depicted control algorithm could be immediately initiated such that the throttle demand input would be controlled based on the reduced demand look up table, such as that exemplified in FIG. 4, or the reduced demand formula, such as exemplified in FIG. 5, and described herein.

A shift command position 68 is assigned at step 102, and the current throttle demand lever position(s) 62 measured by the throttle demand sensor(s) 49 are received at step 104. The throttle demand lever position values 62 received over time are continually assessed at step 106 to see if the shift command position 68 is reached. The throttle demand lever position value(s) 62 are also assessed at step 107 to determine whether the detent positions 40a, 44a have been passed. If so, then a shift command is generated at step 109 to instruct the shift system 22 to the neutral position. For example, if the shift demand sensor failure is detected when the control lever is between one of the detent positions 40a, 44a and a respective shift command position 68, then the system may command a shift to neutral when the throttle demand lever position value(s) 62 reach a value that is equal, or within a predetermined range of, the respective detent position 40a, 44a. Thus, the current gear position of the shift system 22 is maintained until the lever crosses one of the shift command position 68 or one of the detent position 40a, 44a, whichever is first.

In the depicted embodiment where the initial guardian output limit is engaged, the control strategy maintains the initial guardian output limit until initial shift is required at step 106. In embodiments where the initial guardian output limit is not implemented, this initial shift command position check illustrated at step 104, 106, and 108 may be modified or eliminated. Once the shift command position is reached at step 106, then a corresponding shift command is generated at step 108, such as instructing a change in the shift system 22 from a forward gear position or a reverse gear position to neutral position.

The revised throttle demand input strategy is then implemented. The current measured throttle demand lever positions 62 are received at step 110 and the reduced demand look up table is accessed at step 112 to determine the reduced throttle demand input. Step 114 checks whether an alarm command position 73 has been reached. If not, then the method skips to step 118 to determine whether the shift command position has been reached. If one of the alarm command positions 73 has been reached, then a corresponding alarm command is generated at step 116. The throttle demand lever positions 62 are then assessed to determine whether the shift command position has been reached at step 118. If not, then the system continues to measure the current throttle demand lever positions as described above. If the shift command position has been reached, then the corresponding shift command is generated at step 120, and then the control algorithm cycles back to step 110 to receive the current throttle demand lever position(s) 62.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A system for controlling propulsion of a marine vessel by a marine drive, the marine drive having a marine engine that effectuates rotation of a propulsor through a shift system that shifts amongst at least a forward gear position, a reverse gear position, and a neutral position, the system comprising:
   a remote control having a lever movable to provide a throttle demand input for controlling the marine engine and a shift demand input for controlling the shift system;
   a shift demand sensor that measures a shift demand lever position to provide the shift demand input;
   a throttle demand sensor that measures a throttle demand lever position to provide the throttle demand input;
   a control module configured to:
      detect shift demand sensor failure; and
      assign a predetermined throttle demand lever position as a shift command position, such that when the throttle demand lever position reaches the shift command position a shift command is generated to instruct a change in gear position of the shift system.

2. The system of claim 1, wherein the control module is further configured to set a reduced throttle demand limit, wherein a maximum lever position is associated with the reduced throttle demand limit.

3. The system of claim 2, wherein the control module is further configured to access a reduced demand lookup table or a reduced demand formula correlating throttle demand lever positions between the shift command position and a maximum lever position to throttle demand inputs between an idle setpoint for the marine engine and the reduced throttle demand limit.

4. The system of claim 3, wherein the control module is further configured to:
   upon detecting the shift demand sensor failure, limit engine output to an initial guardian output limit; and
   maintain the initial guardian output limit until the throttle demand lever position reaches the shift command position.

5. The system of claim 4, wherein the initial guardian output limit is equal to an idle setpoint for the marine engine.

6. The system of claim 1, wherein the shift command position is a different throttle demand lever position than a detent position for the remote control.

7. The system of claim 1, wherein all assigned shift command positions are forward shift command positions, such that when the lever reaches any of the shift command positions the shift command instructs either the change in gear position from the neutral position into the forward gear position or the change in gear position from the forward gear position into the neutral position.

8. The system of claim 1, wherein the control module is configured to assign a first predetermined throttle demand lever position as a forward shift command position, and to assign a second predetermined throttle demand lever position as a reverse shift command position.

9. The system of claim 1, wherein the control module is further configured to assign at least one predetermined throttle demand lever position sensed by the throttle demand sensor as an alert command position, such that when the throttle demand lever position reaches the alert command position an alert is generated to alert an operator of modified operation of the remote control.

10. The system of claim 9, wherein the control module is further configured to assign two or more alert command positions between a detent position and the shift command position, such that progressive auditory alerts are generated as the throttle demand lever position progresses from the detent position to the shift command position.

11. The system of claim 1, further comprising a second shift demand sensor, wherein the control module is further configured to:
   determine a difference between respective shift demand lever positions measured by the shift demand sensor and the second shift demand sensor; and
   wherein detection of the shift demand sensor failure includes detecting whether either of the respective shift demand lever positions are outside of an acceptable measurement range or the difference exceeds an acceptable difference threshold.

12. A method of controlling a marine drive, the marine drive having a marine engine that effectuates rotation of a propulsor through a shift system that shifts amongst at least a forward gear position, a reverse gear position, and a neutral position, the method comprising:
   receiving a shift demand lever position from at least one shift demand sensor;
   receiving a throttle demand lever position from at least one throttle demand sensor;
   detecting failure of the shift demand sensor;
   assigning a predetermined throttle demand lever position as a shift command position; and
   generating a shift command instructing a change in gear position of the shift system when the throttle demand lever position reaches the shift command position.

13. The method of claim 12, further comprising accessing a reduced demand lookup table or a reduced demand formula correlating throttle demand lever positions between the shift command position and a maximum lever position to throttle demand inputs between an idle setpoint for the marine engine and a reduced throttle demand limit, wherein a maximum lever position is associated with the reduced throttle demand limit.

14. The method of claim 13, further comprising, upon detecting the failure of the shift demand sensor, limiting engine output to an initial guardian output limit;
   maintaining the initial guardian output limit until the throttle demand lever position reaches the shift command position, and then accessing the reduced demand lookup table or the reduced demand formula.

15. The method of claim 12, wherein the shift command position is a different throttle demand lever position than a detent position generating an equivalent shift command during normal operation of the shift demand sensor.

16. The method of claim 15, wherein the shift command position is greater than or equal to 20 percent toward a maximum lever position.

17. The method of claim 12, wherein the step of generating the shift command only includes generating a forward shift command to change the gear position of the shift system from the neutral position into the forward gear position when the throttle demand lever position increases to the shift command position, and generating a neutral shift command to change the gear position of the gear system from the forward gear position into the neutral position when the throttle demand lever position decreases to the shift command position.

18. The method of claim 12, wherein the step of assigning the predetermined throttle demand lever position as the shift command position includes assigning a first predetermined throttle demand lever position as a forward shift command position, and assigning a second predetermined throttle demand lever position as a reverse shift command position.

19. The method of claim 12, further comprising assigning two or more alert command positions between a detent position and the shift command position such that progressive auditory alerts are generated as the throttle demand lever position progresses from the detent position to the shift command position.

20. The method of claim 12, further comprising:
receiving a second shift demand lever position measured from a second shift demand sensor;
determining a difference between the shift demand lever position measured by the shift demand sensor and the second shift demand lever position measured by the second shift demand sensor; and
wherein the step of detecting failure of the shift demand sensor includes detecting whether either of the shift demand lever position or the second shift demand lever position are outside of an acceptable measurement range or the difference exceeds an acceptable difference threshold.

* * * * *